No. 781,737.  PATENTED FEB. 7, 1905.
K. PAULI.
DRAFTING INSTRUMENT.
APPLICATION FILED FEB. 6, 1904.

4 SHEETS—SHEET 1.

Witnesses

Inventor
Knut Pauli.
By Victor J. Evans
Attorney

No. 781,737. PATENTED FEB. 7, 1905.
K. PAULI.
DRAFTING INSTRUMENT.
APPLICATION FILED FEB. 6, 1904.

4 SHEETS—SHEET 2.

Inventor
Knut Pauli.

Witnesses

By Victor J. Evans
Attorney

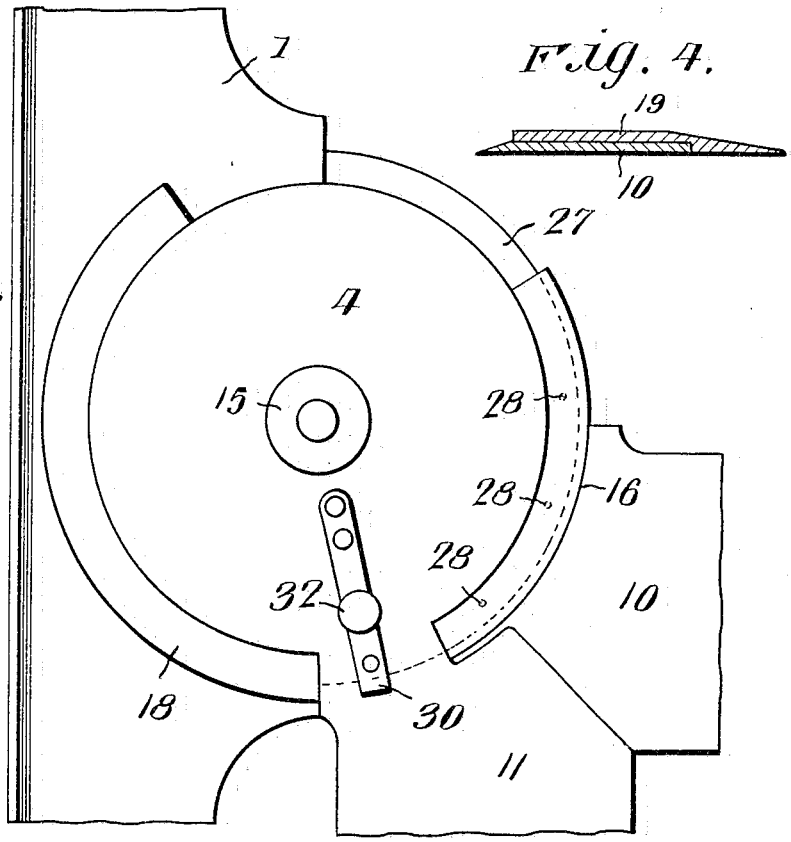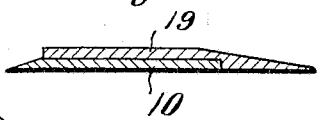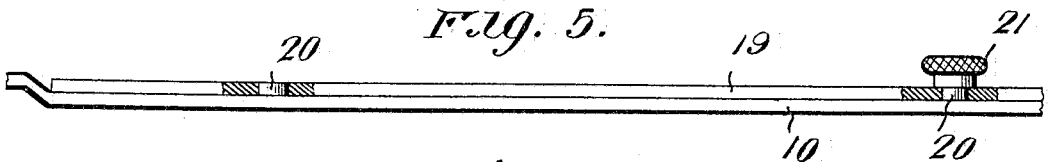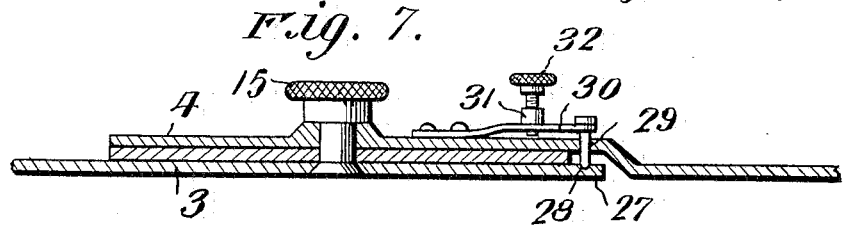

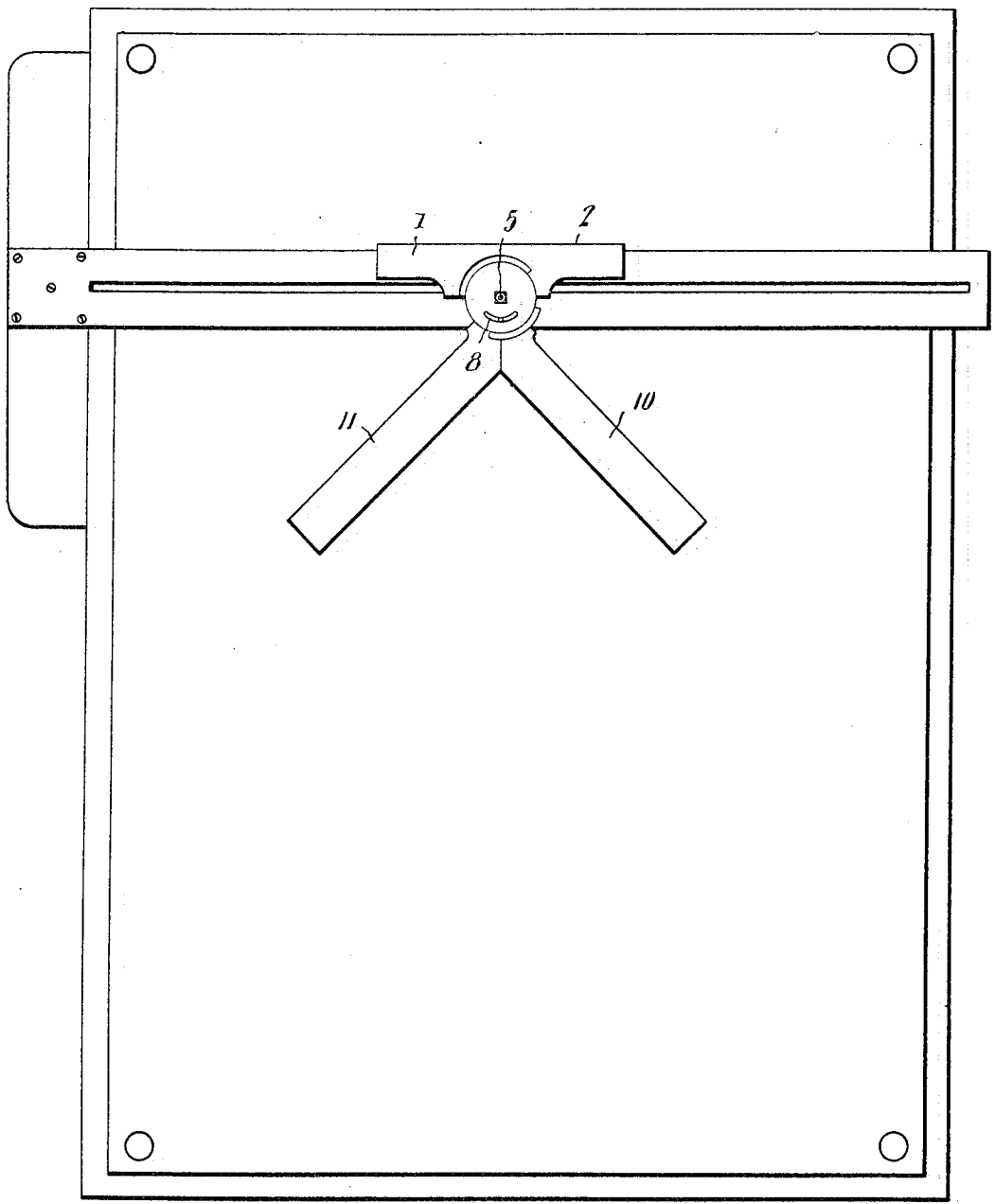

No. 781,737.

Patented February 7, 1905.

UNITED STATES PATENT OFFICE.

KNUT PAULI, OF SYRACUSE, NEW YORK.

DRAFTING INSTRUMENT.

SPECIFICATION forming part of Letters Patent No. 781,737, dated February 7, 1905.

Application filed February 6, 1904. Serial No. 192,388.

*To all whom it may concern:*

Be it known that I, KNUT PAULI, a citizen of Sweden, residing at Syracuse, in the county of Onondaga and State of New York, have invented new and useful Improvements in Drafting Instruments, of which the following is a specification.

This invention relates to drafting instruments, the object in view being to provide a reliable and efficient instrument for the use of draftsmen, architects, and engineers, the same being so constructed and the parts thereof being so combined and arranged with relation to each other that the laying off and protracting of various angles, lines, and measurements may be expeditiously accomplished without resort to other instruments, such as a compass or dividers.

It is also an object of the present invention to so combine the movable parts of the instrument that any desired angle may be obtained with the greatest possible degree of exactness, also to provide means whereby a series of interchangeable and differently-graduated scales may be employed, so as to adapt the instrument as a whole to any of the various uses rendered necessary in the work of engineers, architects, and other draftsmen. The instrument comprises relatively movable or adjustable arms in the form of rulers which are graduated to facilitate the laying off of measurements.

A further object of the invention is to so construct each arm or ruler that it may be composed of light material, such as sheet metal, and yet possess the necessary strength and rigidity to afford the required accuracy and exactness in laying out plans and executing drawings of various kinds.

With the above and other objects in view, the nature of which will more fully appear as the description proceeds, the invention consists in the novel construction, combination, and arrangement of parts, as hereinafter fully described, illustrated, and claimed.

Figure 1:
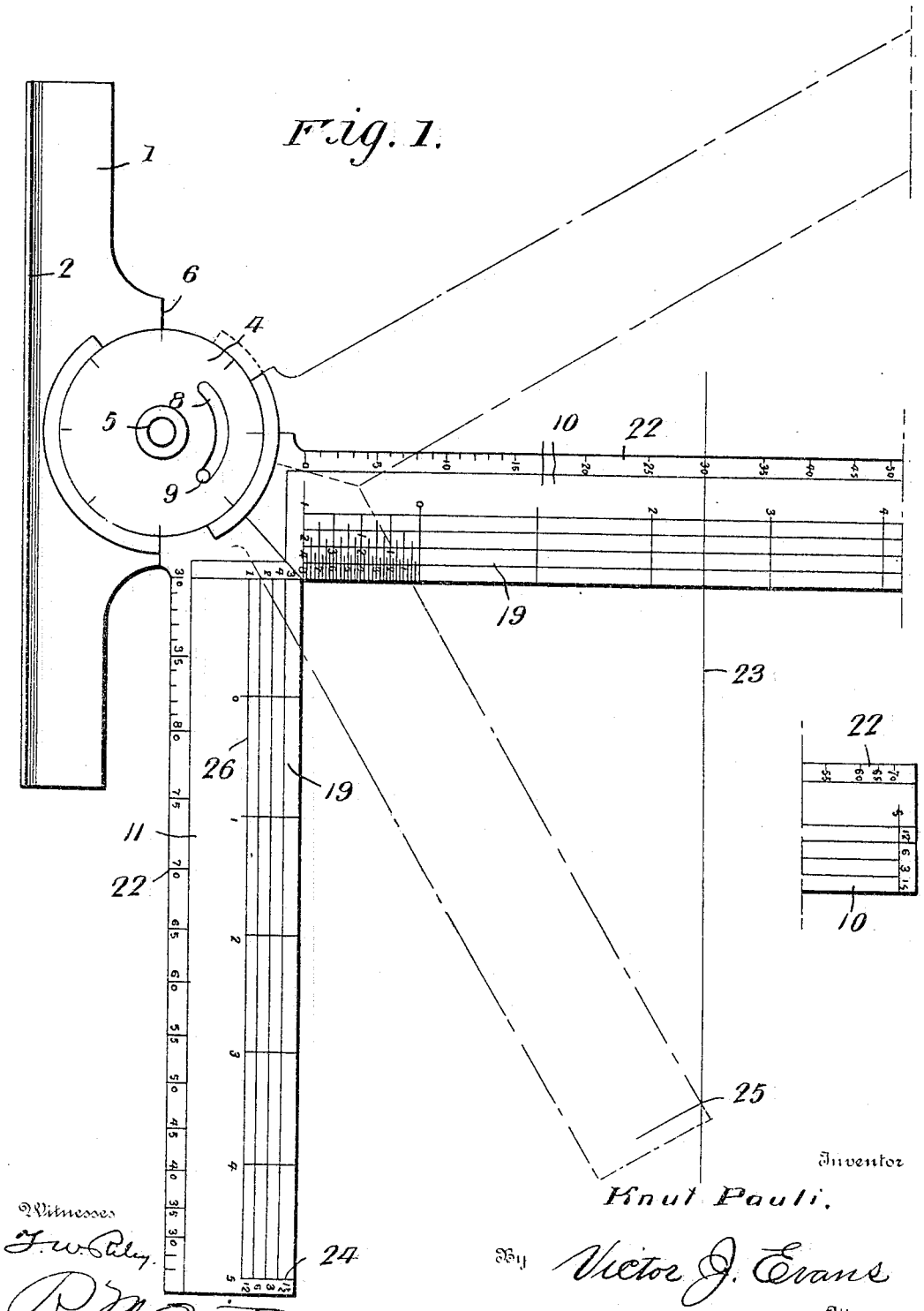
Figure 2:
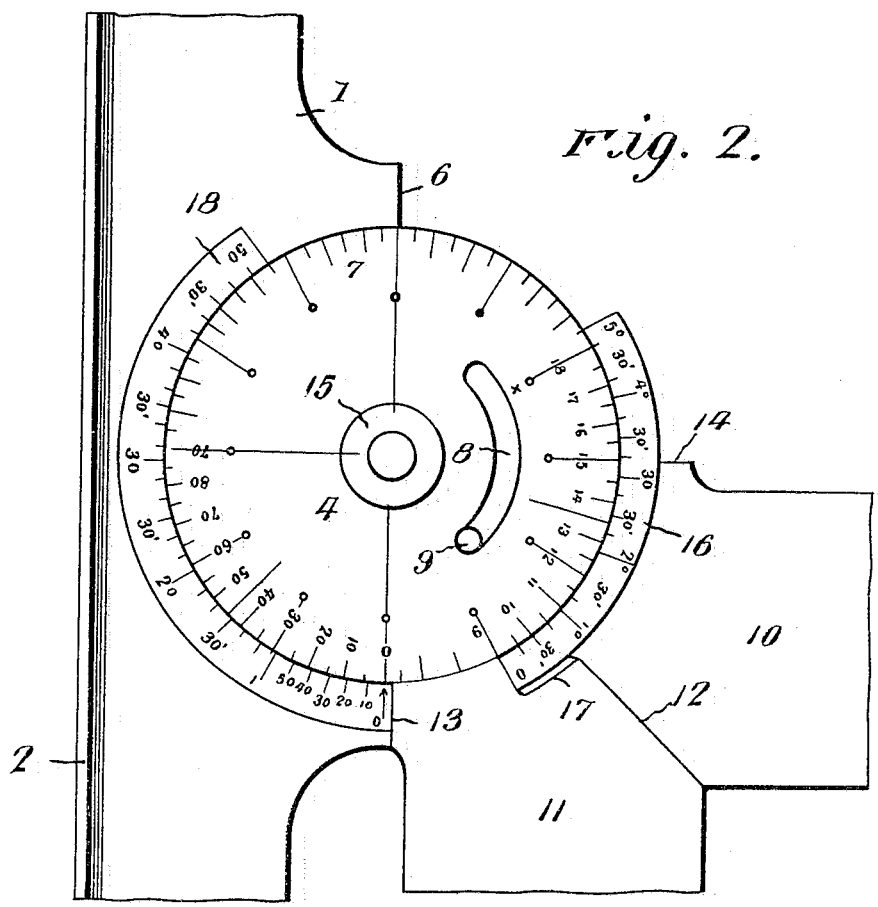
Figure 3:
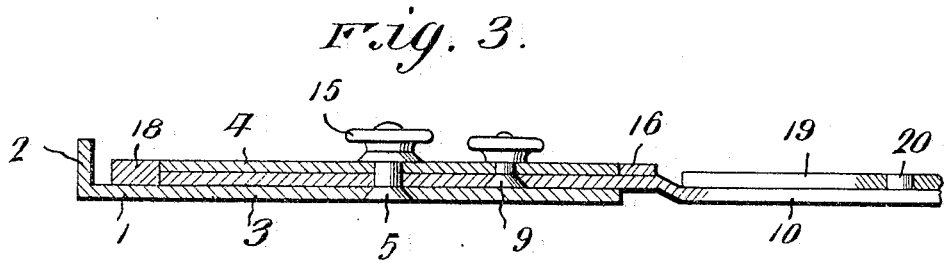

In the accompanying drawings, Figure 1 is a plan view of a drafting instrument embodying the present invention, a portion of one of the arms being removed and set to one side. Fig. 2 is an enlarged plan view of the body or head of the instrument, showing the contiguous ends of the arms or rulers attached thereto. Fig. 3 is a sectional view of the same, taken in line with the pivot of the arms and the clamping device which connects the arms. Fig. 4 is a cross-section through one of the arms or rulers. Fig. 5 is an edge view of one of the arms, showing the ruler attachment partly in section. Fig. 6 is a plan view of the body or head, showing an auxiliary fastening device for locking the two arms or rulers at the more common angles which they occupy relatively to each other. Fig. 7 is a sectional view of the same, taken in line with the locking device. Fig. 8 is a plan view illustrating the method of use of the instrument in connection with a T-square.

Like reference-numerals designate corresponding parts in all the figures of the drawings.

Referring to the drawings, 1 designates the body or T-head of the instrument, which may be of any suitable length and which is provided along its outer portion with a straight-edge, which may consist of a flange 2, extending the entire length thereof and adapted to slide against the edge of a T-square or one edge of a drawing-board in moving and adjusting the instrument to bring the arms or rulers thereof to the proper position on the board. Projecting from the central portion of the body or head 1 is a semicircular extension 3, upon which is mounted a disk-shaped dial 4, having a central opening for a pivot 5, which is directly in line with the inner edge 6 of the body or head 1, said edge 6 being disposed diametrically of the dial. The disk or dial 4 is graduated along its outer edge, as shown at 7 in Fig. 2, and is also provided with a concentric slot 8, through which passes the shank of a clamping bolt or screw 9, which is carried by one of the arms or rulers, hereinafter described, and by means of which one arm may be adjusted to any desired angle with relation to the other arm and held fixed.

In connection with the body or head 1 two arms or rulers 10 and 11 are employed, one of the arms, 10, carrying the clamping device 9, while the other arm, 11, is connected with the dial 4, so that said dial turns with the arm 11. Both of the arms 10 and 11 swing around the pivot 5 as a common center, and adjacent to their inner ends the said arms 10 and 11 are mitered, as shown at 12, or, in other words, provided with meeting shoulders, which stand at an angle of forty-five degrees to the direction of length of the arms. Therefore when the meeting shoulders 12 are in contact with each other the arms 10 and 11 stand exactly at right angles to each other. The arm 11 is further provided with a shoulder 13, extending parallel to the direction of length of the arm, which is adapted to come in contact with the inner edge 6 of the head 1, and when the parts are in the position last described the arm 11 is exactly parallel with the flange 2 of the head, while the arm 10 is exactly at right angles thereto. The arm 10 is provided with a shoulder 14, corresponding to the shoulder 13 of the arm 11, and therefore when the arm 10 is turned until the shoulder 14 comes in contact with the inner edge 6 of the head the said arm 10 extends in a direction exactly parallel with the flange 2 of the head. When the arm 10 is adjusted to the last-named position and the arm 11 is moved against the arm 10 until the miter-joint edges 12 are in contact, the arm 11 stands exactly at right angles to the flange 2 of the head. The pivot 5 is connected directly to the head 1, as shown in Fig. 3, and receives the inner end of the arm 10 and also the dial or disk 4 on the inner end of the arm 11 and is provided with a clamping-nut 15, by means of which both of the arms are securely clamped to the head when brought to the desired adjustment. The arms 10 and 11 are adjusted and made fast to each other by means of the clamping device 9, after which both of the arms are held in fixed relation to the head 2 by tightening the nut 15.

Connected with the arm 10 near its inner end is an arcuate vernier 16, which is described in the same circle as the outer edge of the dial 4, so as to ride against or in close proximity to the edge of the dial, said vernier being graduated, as shown, so as to register with the graduations of the dial and enable the arm 10 to be set at any desired angle to the arm 11. In order to give sufficient scope to the vernier 16, the arm 11 is cut away, as shown at 17, to receive the end portion of the vernier, where it projects on one side of the arm 12. The other end of the vernier 16 projects beyond the opposite side of the arm 10 and is adapted to ride over the head 1 as it moves along the edge of the dial. Another arcuate vernier 18 is provided on the head 1 and is also graduated, as shown, to register with the graduations at the edge of the dial 4 diametrically opposite the vernier 16. The vernier 18 bears a fixed relation to the head, while the dial 4 turns with the arm 11.

From the foregoing description it will be understood that in order to adjust the angle between the arms 10 and 11 the clamps 9 and 15 are loosened, and the arms 10 and 11 are then moved apart until the desired angle is indicated by the vernier 16. The clamping device 9 is then tightened, so as to prevent relative movement between the arms 10 and 11. The arms 10 and 11 are then moved in unison until the desired angle of said arms with relation to the head is obtained, whereupon the clamping device 15 is tightened and the instrument is then in readiness for use.

On the arms 10 and 11 are attached scales 19 so mounted that they may be readily detached and made interchangeable with other scales differently graduated, the main body of the arm being provided with studs 20, which are received in openings in a detachable scale 19, as shown in Fig. 5, the scale being fastened upon the arm by means of a nut 21, threaded upon one of the studs. Other means, however, may be employed for securing the detachable scales to the arms 10 and 11. The scales 19 extend along one side or edge of the arms, while the opposite or outer edges of said arms are graduated as sine-scales, as shown at 22 in Fig. 1, for quick measurement of angles. The verniers above described are also specially designed for quick work, and it will be noticed that considerable distance is left between the graduations of the verniers in order to obtain quick and accurate results. The sine-scales 22 may or may not be used with the verniers.

In order to draw the angles with the aid of sine-scales, a help-line 23 is drawn through the graduation which marks the desired angle. (Shown, for example, in Fig. 1 as the angle of thirty degrees.) This is done while the arms occupy the relation to the head shown in Fig. 1, the arms being at right angles to each other. The arm 11 is then turned until the line of graduation 24 meets the help-line 23, as indicated at the point 25 in Fig. 1, which brings the arm 11 to an angle of exactly thirty degrees to the head or body 1. For angles over forty-five degrees with relation to the head 1 the other arm, 10, is used in the same way as the arm 11, just hereinabove described.

The vernier 16 measures directly fifteen minutes, and angles under that size are estimated easily. The other vernier, 18, estimates ten minutes, and it is possible to estimate with the eye down to a few minutes. The reason why two different verniers are used is that the vernier 18 is the one more frequently used, and hence it is made more accurate, there being only a limited space for the two verniers. The devices on the dial are made in five degrees, as on each protractor in general. The distance between the two graduations on the vernier 18 is four and five-sixth degrees, and the length of the whole scale embraces one hundred and forty-five degrees. The distance between two graduations on the vernier 16 is four and three-fourths degrees, and its entire length embraces ninety-five degrees. In this way by moving the arm 11 to the desired angle we find the value of that angle to the place where two lines on the dial and head come together. On the vernier 16 you measure in the same way by the coincidence of the lines on the said vernier and the dial.

The scales 19 are of special construction or are graduated in such a way as to save the time of the draftsman and enable the eye to quickly find the desired point or graduation in either scale. In other words, each scale embodies lines 26, extending lengthwise thereof, while the graduations are placed thereon so that the finer graduations run through as few scale-fields as possible, thus preserving accuracy and clearness. The main lines of division are made longer, and, if desired, may be of different color to facilitate reading. While the instrument is adapted to be used in connection with an ordinary T-square, it will be understood that the head 1 may be connected with the T-square, so that the latter will form a part of the instrument, in which case some suitable sliding connection must be established between the head 1 and the T-square.

In instruments of the kind hereinabove referred to it is necessary to frequently make use of certain more common angles, such as thirty, forty-five, sixty, and ninety degrees. In order to facilitate adjustment to such angles, resort may be had to the following expedient, consisting of making the extension 3 of the head to project beyond the dial 4, as shown at 27 in Figs. 6 and 7, and providing such extended edge portion with a series of depressions or sockets 28, adapted to receive the extremity of a pin or latch 29, which is carried by the free end of a spring 30, secured at its inner end to the dial 4 and projecting at its outer end beyond the edge of the dial, said spring serving to normally depress the locking pin or latch 29 and hold the same in engagement with one of the sockets 28, to which they may be moved. Intermediate its ends the spring is provided with a threaded boss 31, through which passes an adjusting-screw 32, by means of which the locking-pin may be raised or lowered, so as to hold the same out of engagement with the sockets when not in use. In the use of the locking device just described the pin 29 snaps into any desired socket or depression 28, the said sockets being preferably made rather shallow and flat enough to allow the pin to slide over them. If it is desired to adjust the arms to an angle which would bring the pin 29 very close to one of the sockets 28, said pin may be held raised by turning the screw 32 downward, said screw bearing against the dial and holding the pin 29 elevated. The instrument as a whole is also adapted for the use of either pen or pencil, while the various scales and verniers enable the draftsman to compute angles and distances with ease, certainty, and celerity.

Having thus described the invention, what I claim as new is—

1. A drafting instrument comprising a T-head, a pair of arms or rulers connected therewith by a common pivot, and provided with meeting shoulders or mitered joints at certain angles making together ninety degrees to the direction of length of the arms, means for maintaining the angle of the arms with respect to each other when adjusted, and means for maintaining the angle of one or both of the arms and the head when adjusted.

2. A drafting instrument comprising a T-head, a pair of arms or rulers connected therewith by a common pivot and provided with meeting shoulders or mitered joints whereby the arms can be quickly disposed at right angles to each other, and a double vernier connected with the three main parts of the instrument in such a way as to quickly read at the same time the angle between the arms and between each arm and the head.

3. A drafting instrument comprising a T-head, a pair of arms or rulers connected thereto by a common pivot and provided with mitered meeting shoulders, a dial connected to and movable with one arm, a vernier connected with the other arm, and a fixed vernier on the head, both verniers being adapted to register with the dial.

4. A drafting instrument comprising a T-head, a pair of arms or rulers connected therewith by a common pivot and provided with mitered shoulders, a graduated dial connected with one arm and receiving the common pivot through its center, a clamping device connected with the other arm and movable in a concentric slot in the dial, and verniers on one of the arms and the head adapted to register with the dial, substantially as described.

5. A drafting instrument comprising a T-head provided with sockets, arms or rulers connected therewith on a common pivot and provided with mitered meeting shoulders, a dial connected to and movable with one of the arms, and a lock pin or latch carried by the dial and placed under tension so as to automatically snap into sockets or depressions in the head, substantially as described.

6. A drafting instrument comprising a head, arms or rulers connected thereto, by a common pivot and provided with mitered meeting shoulders, a dial attached to one of said arms, a semicircular extension on the head projecting beyond the edge of the dial and provided with sockets, and a pin on the dial adapted to engage said sockets as the dial is turned.

7. A drafting instrument comprising a head, arms or rulers connected thereto by a common pivot and provided with mitered meeting shoulders, a dial attached to one of said arms, a semicircular extension on the head projecting beyond the edge of the dial and provided with sockets, and a spring-arm connected with the dial and provided with a pin adapted to engage said sockets as the dial is turned, substantially as and for the purpose specified.

8. A drafting instrument comprising a head, arms or rulers connected therewith by a common pivot and provided with mitered meeting shoulders, and a dial connected to one of said arms, a spring-arm connected to the dial and provided with a lock-pin adapted to engage sockets in the head, and an adjusting-screw carried by the spring-arm and adapted to hold the locking-pin out of engagement with said sockets, substantially as described.

9. A drafting instrument comprising a head, arms or rulers connected therewith by a common pivot and provided with mitered meeting shoulders, means for maintaining the angle between the arms and also the angle between the arms and the head, and interchangeable scales detachably connected with one or both of said arms, substantially as described.

In testimony whereof I affix my signature in presence of two witnesses.

KNUT PAULI.

Witnesses:
KATHARINE ALLEN,
GEORGE M. BOND.